United States Patent [19]

Hashimoto et al.

[11] 4,230,403
[45] Oct. 28, 1980

[54] MOUNTING FOR INTERCHANGEABLE CAMERA LENS ASSEMBLY WITH DIAPHRAGM MEANS

[75] Inventors: Shigeru Hashimoto; Taizo Mitani, both of Kanagawa; Takashi Isobe, Tokyo; Masao Aoyagi, Kanagawa; Akiyasu Sumi, Kawasaki; Katsumi Tanaka, Tokyo, all of Japan

[73] Assignee: Canon Kabushiki Kaisha, Tokyo, Japan

[21] Appl. No.: 875,096

[22] Filed: Feb. 3, 1978

[30] Foreign Application Priority Data

| | | |
|---|---|---|
| Feb. 8, 1977 [JP] | Japan | 52/12827 |
| Feb. 9, 1977 [JP] | Japan | 52/13391 |
| Feb. 9, 1977 [JP] | Japan | 52/13392 |
| Apr. 6, 1977 [JP] | Japan | 52/39176 |
| Apr. 18, 1977 [JP] | Japan | 52/44247 |

[51] Int. Cl.³ .............. G03B 7/02; G03B 9/02; G03B 17/00
[52] U.S. Cl. .............. 354/286; 350/257; 354/272
[58] Field of Search .............. 354/270, 272, 286, 288, 354/40, 41, 46, 202; 350/252, 257

[56] References Cited

U.S. PATENT DOCUMENTS

| | | | |
|---|---|---|---|
| 3,067,665 | 12/1962 | Gebele et al. | 354/272 |
| 3,388,647 | 6/1968 | Yajima | 354/286 |
| 3,675,550 | 7/1972 | Ishizaka | 354/46 |
| 3,722,390 | 3/1973 | Schlapp et al. | 354/270 |
| 3,864,707 | 2/1975 | Shirasaki | 354/272 X |
| 3,906,534 | 9/1975 | Shirasaki | 350/257 X |
| 4,003,068 | 1/1977 | Hashimoto et al. | 354/286 |

FOREIGN PATENT DOCUMENTS

| | | | |
|---|---|---|---|
| 2062647 | 12/1970 | Fed. Rep. of Germany | 354/272 |
| 1111400 | 10/1955 | France | 354/286 |
| 2044541 | 2/1971 | France | 354/286 |
| 1067584 | 5/1967 | United Kingdom | 354/272 |

Primary Examiner—Donald A. Griffin
Attorney, Agent, or Firm—Toren, McGeady and Stanger

[57] ABSTRACT

An interchangeable lens assembly for a camera including a lens barrel having a diaphragm mechanism mounted therewith, a bayonet coupling mechanism fixed on the lens barrel and adapted to be brought into engagement with a complementary coupling mechanism on the camera for releasably mounting the lens assembly in operative position on the camera, an adapter shell mounted on the lens barrel in rotative relationship relative thereto for establishing predetermined relative positioning between the interchangeable lens assembly and the camera, and a retainer mechanism adapted to be interposed between the adapter shell and the camera for retaining the adapter shell in fixed rotative position relative to the camera during mounting and dismounting of the interchangeable lens assembly. The lens assembly also includes a diaphragm presetting mechanism for transmitting signals representative of a diaphragm aperture between the lens assembly and the camera. Since coupling and decoupling of the lens assembly is performed by rotating the lens barrel relative to the camera housing, while the adapter shell remains stationary, the diaphragm presetting mechanism is provided with a device for assuring that an arm extending between the camera and the lens assembly is located in a predetermined angular position relative to a slot in the stationary adapter shell before and after the unit is attached to and detached from the camera housing despite the fact that the range of rotative tightening movement of the tube may be larger or smaller than that of movement of the arm. Thus the operator is able to detach the unit with the position of the diaphragm ring left unchanged.

37 Claims, 16 Drawing Figures

MOUNTING FOR INTERCHANGEABLE CAMERA LENS ASSEMBLY WITH DIAPHRAGM MEANS

BACKGROUND OF THE INVENTION

1. Field of the Invention

This invention relates to an interchangeable lens assembly of a camera, and more particularly to a lens unit which may be attached to and detached from a camera body with ease while preserving accurate and reliable angular alignment of the diaphragm mechanism of the unit to that part of an automatic exposure control apparatus which is incorporated in the camera body.

2. Description of the Prior Art

Interchangeable lenses such as standard, wide angle, telephoto or zoom lenses, may be coupled to a camera body by several methods, and the conventional types of coupling devices may be classified into three main categories. One such device is called a "multi-revolution screw coupling". This device is constructed with a male screw thread formed on a rear end outer diameter of a main support tube in which the objective is mounted and a female screw thread formed on the inner diameter of a bore provided through the wall of the front panel of the camera housing. When the interchangeable lens is joined to the camera body, the tube is turned in adaptation to the bore until the radial shoulder of the tube abuts against the front panel. As the tube is driven to advance by the action of the helix angle, it is tightened by the frictional force exerted between the bearing surfaces as a result of the wedge effect created thereon. Such coupling requires the establishment of accurate correspondence between the male and female threads, and it is therefore troublesome and often cannot be rapidly established. Further, because of the necessity that the tube be turned through a large number of revolutions, the coupling is time-consuming. An additional serious disadvantage is that the final angular position of the tube relative to the camera body varies depending upon the torque applied to the tube.

The second category is called "bayonet coupling". This device comprises male and female bayonet members provided respectively on the tube and the camera housing. During the coupling operation, the male bayonet member is slidably inserted into the female bayonet member and then turned by rotating the tube about the optical axis of the lens, while the camera housing is maintained stationary. An advantage of this coupling device is that the final angular position of the tube relative to the camera housing can be determined with high accuracy by an abutment pin provided on the tube or on the camera housing for mechanically or electrically introducing a manually preset value of diaphragm aperture from the tube into the camera body and for automatically closing down the diaphragm as controlled from the camera body.

When the tube is tightened on the camera housing, however, rotation of the tube is required which in turn causes movement of transmission members which project from the tube into a space within the camera housing. Accordingly, the camera housing specified for use with such tube must be designed so that nothing is located in the paths of movement of the transmission members. Thus, such camera housing can not be interchanged with other types of camera housings, and this characteristic of the coupling device prejudices the usefulness of and interchangeability thereof. Another disadvantage arising from a plurality of transmission members is that, as it is impossible to clear up the space through which the transmission members are moved during the coupling operation, the control members for the transmission members in the camera housing must be provided with buffering means to avoid mechanical interference which would be otherwise encountered between the transmission members and the control members in sequence.

The third category coupling device which has overcome the drawbacks of the second category is typically disclosed in U.S. Pat. No. 3,906,534, in which one of the two bayonet coupling members corresponding and complementary with each other is made moveable with reference to its carrier, that is, the tube, or the camera housing, and is constructed in the form of a ring arranged to be journalled around an adapter shell which constitute the rear part of the tube. After the adapter shell of the tube is slidably fitted into the bore of the camera housing, the aforesaid moveable ring is brought into angular alignment with the corresponding and complementary coupling member, and then turned in a tightening direction, while the adapter shell remains stationary.

This type of coupling device assists in achieving accurate and reliable establishment of operative connection between the diaphragm responsive transmission and the control device therefor in the camera body regardless of the number of transmission components provided. Also, the common disadvantage of the aforesaid first and second categories can be eliminated. For example, the occurrence of deviation of the axial position and flatness of the abutment surfaces of the adapter shell and the camera housing caused by the wearing-out of the abutment surfaces due to the frictional relative movement of one abutment surface to the other can be eliminated. But, an alternate disadvantage is introduced because of the requirement of locating the coupling ring at a point within a longitudinally small space in the vicinity of the abutment surface of the adapter shell. Thus, the accessibility to and the management of the coupling ring are not sufficiently secured. Particularly with cameras emphasizing convenience, the diaphragm ring, focusing ring and other actuating members are arranged on a common support tube which is short in the longitudinal direction. Thus, the space available to receive the coupling ring of such structure is not large enough to permit the necessary input torque to be exerted by the fingers of the operator.

Attempts have been made to obviate all the above mentioned drawbacks of the conventional coupling methods by imparting relative motion to the main support tube and the adapter shell so that the operator is able to drive the coupling ring for rotation by grasping the tube while the adapter shell remains stationary. As the diaphragm mechanism is mounted in the main support tube, however, provision must be made for assuring retention of the diaphragm responsive or transmission members in accurately and reliably adjusted positions before and after the tube is attached to and detached from the camera housing. Otherwise it is impossible to achieve establishment of operative connection between the diaphragm responsive transmission and the control device therefor, as the latter assumes a predetermined position which is located either in coincidence with or slightly beyond the terminal end of returning movement of the transmission.

Accordingly, it is an object of the present invention to provide a detachable mechanical unit for mounting the objective and diaphragm of a camera, said unit being easily manageable to exert an input torque on the coupling device, while achieving accurate and reliable establishment of operative connection between the diaphragm responsive transmission and the control device therefor which is mounted in the camera body.

Another object of the invention is to provide such a device which automatically drives the diaphragm transmission to be reset in the initial position when the unit is detached from the camera housing with the diaphragm ring on the lens barrel being left in any position, regardless of whether the entire range of movement of the transmission is larger or smaller than that of rotative tightening releasing movement of the main support tube in which the diaphragm is mounted.

SUMMARY OF THE INVENTION

Briefly, the present invention may be described as an interchangeable lens assembly for a camera comprising: lens barrel means having diaphragm means mounted therewith; coupling means fixed on said lens barrel means adapted to be brought into engagement with complementary coupling means on said camera for releasably mounting said lens assembly in operative position on said camera; adapter means mounted on said lens barrel means in rotative relationship relative thereto for establishing predetermined relative positioning between said interchangeable lens assembly and said camera; and retainer means adapted to be interposed between said adapter means and said camera for retaining said adapter means in fixed rotative position relative to said camera during mounting and dismounting of said interchangeable lens assembly. The diaphragm means comprise diaphragm setting control means including a transmission arm for transmitting diaphragm aperture signals between the lens assembly and the camera. Since, during coupling and decoupling of the lens assembly, the lens barrel is rotated relative to both the camera and the adapter means, which are retained rotatively fixed relative to the camera, the assembly of the present invention further includes means for returning the diaphragm setting control means to a predetermined position relative to the adapter means when the lens assembly is dismounted from the camera. More specifically, the invention operates to return the transmission arm against the end of an arcuate slot formed in the adapter means when the lens barrel means is rotated to decouple the lens assembly.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
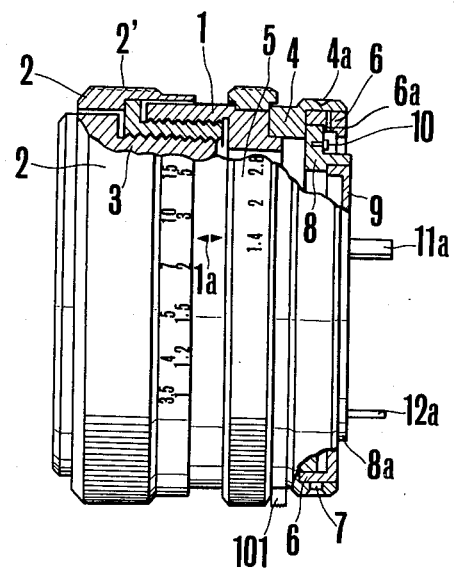
FIG. 1 is a side elevation of one embodiment of an interchangeable mechanical mounting unit for an objective and diaphragm of a camera according to the present invention, parts thereof being cut away to show the arrangement and construction of the moving parts on a main support tube.

Referring to FIGS. 1 to 9 and first to FIG. 1, there is shown one embodiment of a lens assembly or mechanical unit for housing and operating an objective and a diaphragm of a camera, the objective having a front member movable for focusing, and the unit including a main support tube or lens barrel 1. A mounting mechanism for the movable front member comprises an actuating sleeve 2 whose rear end is constituted of a thin tubular wall having distance scales cooperative with an index mark 1a formed on the outer surface of the tube 1. The tubular wall overlaps and is rotatably fitted over the front end of the tube 1. The actuating sleeve or focusing ring 2 is fixedly connected to an intermediate sleeve 2' having outer and inner surfaces on which are formed respective threads engaging with mating threads respectively formed on the inner diameter of the enlarged bore in the front end of the main support tube 1 and the outer diameter of a lens cell 3 in which the focusing member is mounted.

Though not shown, means is provided for converting rotation of the focusing ring 2 to translation of the lens cell 3 along the optical axis.

Rearwardly of the main support tube 1, a collet or ring 4 is provided in fixedly secured relation. The rear end of the collet 4 is increased in inner diameter to afford a space which is occupied by a bayonet member 6 and a front radial flange of an adapter shell 8. The bayonet member 6 is fixed to the collet or ring 4 by screws 7, while the adapter shell 8 is freely fitted into the front bore of the bayonet member 6 and seated against the radial shoulder of the collet 4. The adapter flange has a rear shoulder which serves as a reference surface for abutment against the front panel of a camera housing (see FIG. 4(A)), and on which is fixedly mounted an angular position adjusting pin 10 in radial alignment with an index mark 4a formed on the outer surface of the collet 4, before the unit is attached to the camera body and after it is detached therefrom.

Figure 2:
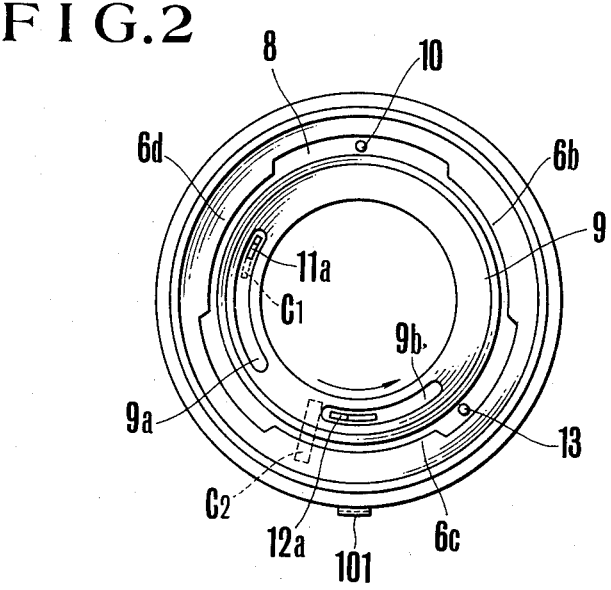
FIG. 2 is a rear elevation of the unit of FIG. 1 in a detached position from a camera body.

As shown in FIG. 2, the bayonet member 6 is formed with three inturned radial extensions or pawls 6b, 6c and 6d angularly spaced from each other by about 120 degrees to provide three arcuate recesses which are aligned with and generally correspond to radial extensions 25a, 25b and 25c of a mating bayonet coupling member 25 (see FIGS. 4 and 5) formed on the front panel of the camera housing around its bore for reception of the adapter shell 8. In the detached position, the aforesaid pin 10 is located in axial alignment with the center of the area of the top recess between the pawls 6b and 6d. Axially projected into a space within the recess between the pawls 6b and 6c is an actuating pin 13 for an adapter shell locking mechanism or releasable interlocking means of which the details are shown in FIG. 3.

Figure 4A:
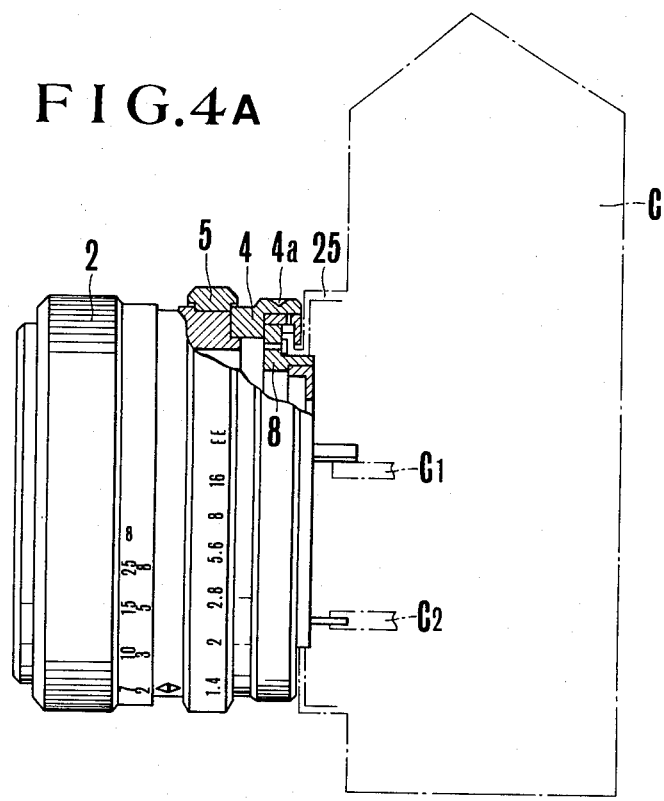
FIG. 4(A) shows an initial state of operative connection between the diaphragm transmission and the control device therefor.
Figure 4B:
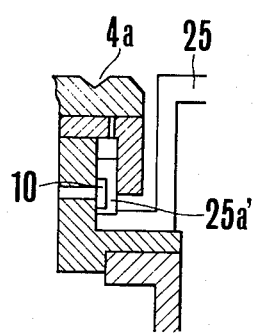
FIG. 4(B) is a fragmentary sectional view showing an initial state of abutting engagement of the unit with the camera body.
Figure 5:
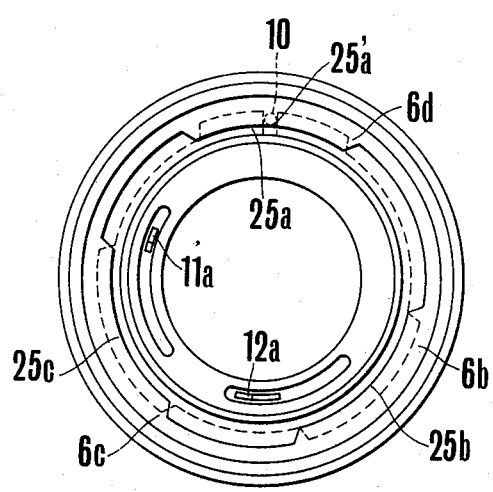
FIG. 5 is a rear elevation of the unit of FIG. 4 in a fully tightened position.

This mechanism further includes a detent pin 14 seated in a fitted axial hole 4b formed in the inturned radial flange of the collet 4 and biased by an expansion spring 15 to project into an accommodating hole 8c formed through the wall of the radial flange of the adapter shell 8, when the actuating pin 13 freely fitted in this accommodating hole is not depressed. When the adapter shell 8 is slidably inserted into the bore of the camera housing to the full axial length thereof, the interface between the actuator pin 13 and the detent pin 14 is moved to coincide with that between the adapter shell 8 and the collet 4 to enable the operator to turn the collet 4 with the bayonet member 6 about the axis of the objective or of the lens assembly in a tightening direction by grasping the main support tube or lens barrel 1, while maintaining the adapter shell 8 stationary relative to the camera housing, as the pin 10 is retained by a corresponding detent recess or slot 25a' formed in the front panel of the camera housing as shown in FIG. 4(B). It should be understood that the collet or ring 4 is fixed relative to the lens barrel 1 and that rotation of the barrel 1 will effect simultaneous rotation of the ring 4 and of the bayonet member 6.

Figure 3:
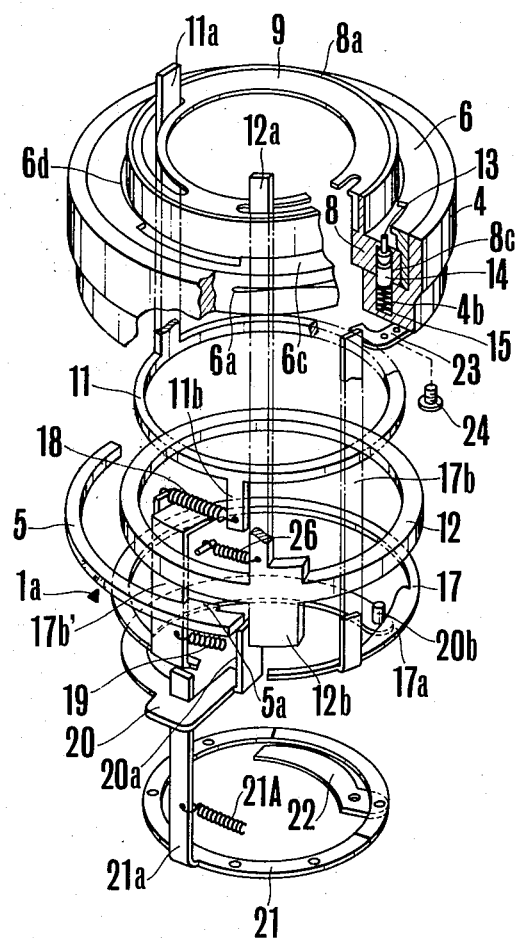
FIG. 3 is an exploded perspective view of a diaphragm presetting and closing down mechanism mounted in the unit of FIGS. 1 and 2 and shown in the detached position, parts thereof being cut away to show the structure of an adapter shell locking device.

In FIG. 3, the diaphragm presetting mechanism includes an actuating member or diaphragm ring 5 rotatably fitted on the lens barrel 1 at a recess adjacent the front end of the barrel 1 and having a diaphragm value scale formed thereon and cooperative with the common index mark 1a of the distance scale. A cam ring 17 is movably mounted on the barrel 1 and has an inner diameter which is tapered or eccentrically formed in part to provide a camming surface 17a. A driving spring 19 is connected between the lens barrel 1 and an axially upwardly or rearwardly extending projection 17(b') of the cam ring 17 to urge the latter to follow the diaphragm ring 5 by engagement of the projection 17(b') with the lug 5a which projects through and internally beyond a circumferential slot of certain angular extent formed through the wall of the barrel 1 so that any diaphragm value selected on the scale by turning the diaphragm ring 5 to place that value in alignment with the index mark 1a can be introduced into the cam ring 17.

The diaphragm closing down mechanism or operating means includes an operating member 12 rotatably mounted in the lens barrel 1 and having an axially rearwardly extending arm 12a which projects through and outwardly beyond an arcuate slot 9b provided through a rear end cross-wall 9 of the adapter shell 8 and is retained at an initial point near the left-hand terminal end of the slot 9b as viewed in FIG. 2 by a first retaining spring 26 which is engaged between the lens barrel 1 and the operating member 12. With the lens assembly mounted on the camera, the operating ring 12 will be in a position to contact the driving member C2 disposed within the camera. When the camera is released, this operating ring or member 12 is automatically actuated at the arm end 12a by a drive member C2 in the camera body to move against the force of the retaining spring 26 through the almost full length of the slot 9b, and after the completion of an exposure to return to the initial position illustrated under the action of the spring 26. In the first half cycle of operation of the ring 12, a semi-circular member 20 which is linked to a diaphragm blade control ring 21 through an axially upwardly or rearwardly extending arm 21a is turned under the action of a drive spring 21A from an initial position where the diaphragm aperture is fully open to a presetting controlled by the cam ring 17, and as a result a lug 12b of the operating ring 12 in engagement with an upwardly or rearwardly extending end portion 20a permits rotation of the member 20 and consequently of the diaphragm ring 21 while a cam follower pin 20b fixedly mounted on the opposite end of the semi-circular member 20 abuts against the camming surface 17a of the ring 17. One of the diaphragm blades is indicated at 22. Actuation of the diaphragm blades 22 under the action of the spring 21A may then occur to an extent determined by the shape and position of the caming surface 17a which determines the aperture opening.

A mechanism is provided for introducing either a manually set or an automatically adjusted value of diaphragm aperture to or from that part of an automatic exposure control apparatus which is incorporated in the camera body, when used in the diaphragm or shutter preselection automatic exposure range respectively. This mechanism comprises a transmission member in the form of an intermediate ring 11 having an axially upwardly extending transmission arm 11a which projects through and outwardly beyond an arcuate slot 9a provided through the wall 9 of the adapter shell 8, said slot 9a being concentric to the slot 9b and angularly spaced therefrom by a distance of about 90 degrees measured at their initial ends, with a tension spring 18 being connected between the extension 17b' of the presetting control cam ring 17 and a lug 11b downwardly extending from the intermediate ring 11 the spring 18 being arranged to bring the extension 17b' and the lug 11b into operative engagement with each other when the lens assembly unit is coupled with the camera body where the various components of the lens assembly will be at the position illustrated in FIG. 6.

In order to retain the transmission arm 11a in the initial or predetermined position after the unit is detached from the camera body while permitting the diaphragm ring 5 to remain unchanged from any set position to the aperture fully open position, there is provided a drive member 23 fixedly mounted on the radial flange of the collet 4 by fasteners 24 in combination with an upwardly extending projection 17b of the cam ring 17. With the diaphragm ring 5 set in the position for the minimum possible size of diaphragm aperture, when the lens barrel 1 together with the coupling means 6 is turned with respect to the camera body and the adapter shell 8 in the opposite direction to the tightening one, the cam ring 17 is driven by the drive member 23 to move against the force of the drive spring 19 until the arm 11a abuts against the terminal end of the slot 9a. At diaphragm settings of larger aperture sizes, the spring 18 serves as a second retaining spring.

Figure 7:
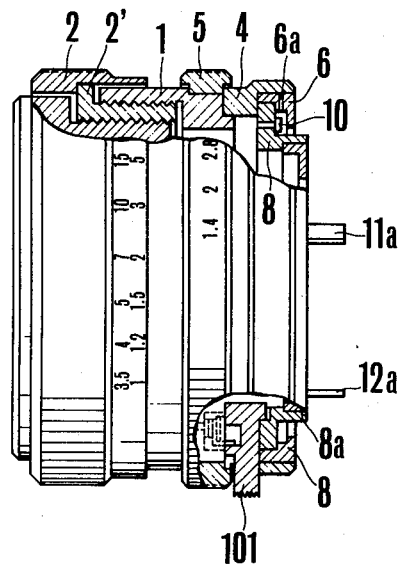
FIG. 7 is a sectional view of an example of a lens barrel locking device adapted for use in the unit of FIGS. 1 to 6.
Figure 8:
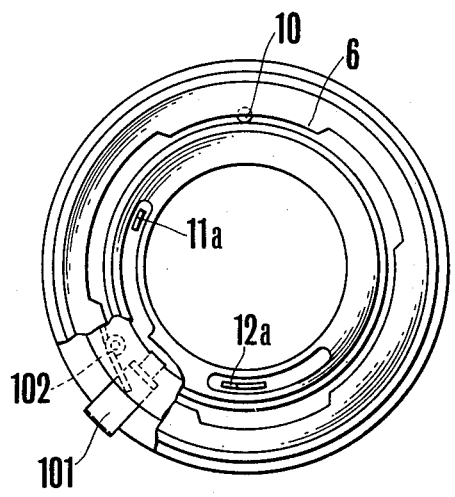
FIG. 8 is a side elevation of the device of FIG. 7.
Figure 9:
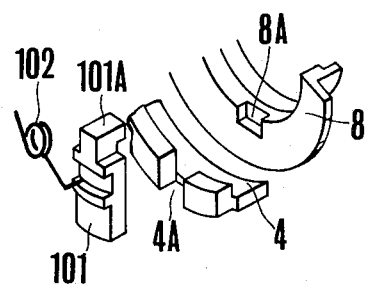
FIG. 9 is an exploded perspective view of the device of FIGS. 7 and 8.

In FIGS. 7 to 9, there is shown a mechanism for locking the unit on the camera in the fully tightened position where the entire effective range of movement of the diaphragm responsive or transmission ring 11 can be assured as no mechanical interference between the drive member 23 and the extension 17b occurs. This mechanism comprises an actuating button 101 slidably fitted in a radial hole 4A which is formed in the thickened front part of the collet 4 adjacent the front shoulder of the flange of the adapter shell 8, a bias spring 102 urging the actuating button 101 to project outwardly beyond the hole 4A, and a detent radial recess 8A formed in the flange of the adapter shell 8 and arranged to receive a rearwardly extending projection 101A of the actuating member 101 when the collet 4 is turned from the position of FIG. 2 to the position of FIG. 8. This locking mechanism also serves as a mechanism for preventing accidental disengagement of the unit from the camera body.

The operation of the unit of FIGS. 1 to 9 is as follows: The operator will first manipulate the unit to effect axial alignment of the index mark 4a with the corresponding mark (not shown) on the front panel of the camera housing, and then insert the adapter shell 8 at its rear end outer diameter 8a into the bore of the camera housing by grasping the main support tube or lens barrel 1, whereby the bayonet members 6 and 25 are placed in mating relation to each other. At the terminal end of axial movement of the unit, the radial shoulder of the adapter shell 8 comes to abut against the front surface of the camera housing, and the relative angular position adjusting pin 10 enters the recess 25a' (see FIG. 4(B)). Also, the actuator pin 13 is pushed against the force of spring 15 so that the detent pin 14 is retracted from the hole 8c to enable the operator to perform a tightening operation. As a result, the lens barrel 1 together with all the lens operative components mounted thereon, and with the bayonet member 6, will be free to rotate relative to the camera and to the adapter shell 8.

During the tightening operation, the main support tube or lens barrel 1 is turned about the axis of the objective in a clockwise direction as viewed from the front together with the diaphragm presetting mechanism supported by the tube 1, while the adapter shell 8 is maintained stationary relative to the camera. It should be understood that if the lens unit is utilized with a shutter priority camera, the transmission arm 11a will not move when the lens unit is mounted since, with the diaphragm ring in the automatic position, control elements within the camera will retain the arm 11a stationary. When the lens unit is used on an aperture priority camera, the arm 11a will move relative to the slot 9a depending upon the set position of the ring 5. It will be apparent that such movement will be the result of a spring force basically created by the spring 19 which will become effective when the drive member 23 is moved from the extension 17b to permit rotation of the ring 17. In either case, the arm 12a will remain stationary relative to the slot 9b since when the lens 1 is rotated to couple the lens unit to the camera, the degree of angular movement thereof will not be sufficient to release the force of the spring 26 tending to hold the arm 12a in abutment with the terminal end of the slot 9b. During this operation the relative angular displacements between the ring 11 and the cam ring 17 and between the operating ring 12 and the tube 1 are absorbed by the respective springs 18 and 26. When the tightened angular position of the tube 1 reaches about 60 degrees from the initial position of FIG. 3, the locking mechanism for the tube 1 starts to operate so that the projection 101A drops into the recess 8A under the action of the spring 102. This causes the release actuating button 101 to project outwardly over the outer diameter of the collet 4 as shown in FIG. 8. Since the bayonet member 6 is provided with three circumferential slits 6a of equal angular extent formed in the tubular section thereof in correspondence with the respective pawls 6b, 6c and 6d to thereby impart resilient characteristics thereto, a sufficiently sturdy connection between the unit and the camera body is established in the locked position of FIG. 8.

Figure 6:
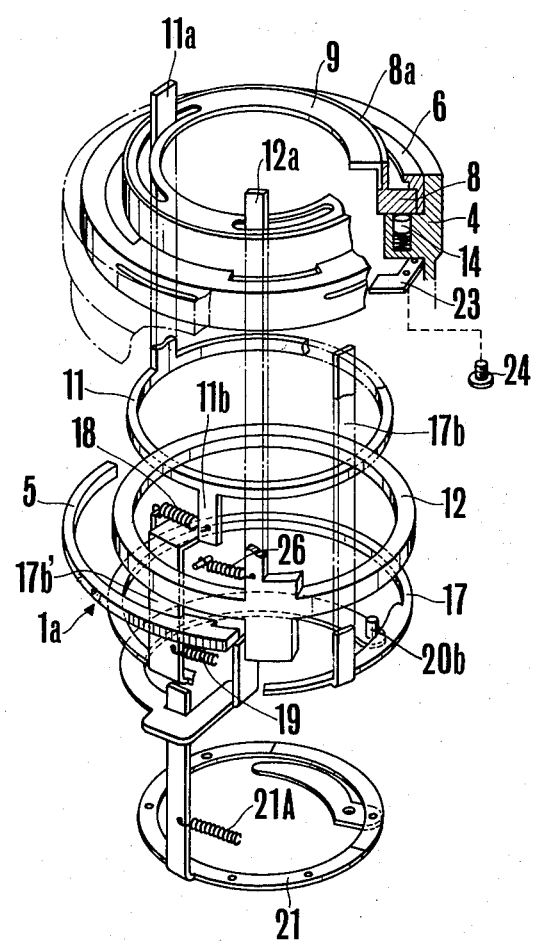
FIG. 6 is a similar view to that of FIG. 3 but showing the lens assembly in the coupled position.

If the diaphragm ring 5 is initially taken at the aperture fully open position, in this instance, F/1.4, it is at the terminal end of tightening rotation of the tube 1 that the cam ring extension 17b' starts to engage with the transmission ring lug 11b, as shown in FIG. 6, while the drive member 23 is moved away from the extension 17b to such an extent that when the diaphragm ring 5 is turned to set the maximum possible diaphragm value (the minimum size of aperture), the extension 11b does not interfere with the drive member 23. This occurs because the angular extent of the entire operating range of the transmission ring 11 is smaller than that of tightening movement of the tube 1. So long as the diaphragm ring 5 assumes the illustrated position for the minimum diaphragm value, namely, 1.4, the transmission arm 11a is retained in the uppermost position of the slot 9a during the tightening operation because of the spring force of the spring 18. As a result, no stress is applied to the operative connection between the transmission arm 11a and the control member C1 of the camera body. In the diaphragm pre-selection automatic exposure range, therefore, the set value of diaphragm aperture by the ring 5 is introduced through the cam ring 17 and transmission ring 11 to the control member C1 in the camera body. An exposure value is thereby derived to control the period of actuation of the camera shutter in accordance with the preselected diaphragm value, object brightness as sensed by the TTL type light metering at the full open aperture, and the sensitivity of the used film. When the shutter release button (not shown) is depressed, the control member C2 is actuated to move to the right as viewed in FIG. 2 to actuate the arm 12a with simultaneous occurrence of automatic closing down of the diaphragm blades 22 which continues until the cam follower pin 20b strikes the camming surface 17a at a point dependent upon the set value of diaphragm aperture. After an exposure has been completed, the closing down actuator 12a is returned under the action of the spring 26 to the initial position where the diaphragm blades 22 are fully open. In the shutter preselection automatic exposure range, with the diaphragm ring 5 turned to a point beyond the maximum diaphragm value of the scale, the exposure value is translated to the proper position of the transmission arm 11a.

If it is desired to interchange the unit with another one of different rating, the lock release button 101 is first depressed then the tube 1 is turned relative to the camera housing in the opposite direction to the tightening direction until the index mark 4a is aligned with the corresponding mark on the camera housing, and the tube 1 is pulled from the camera body. The adapter shell 8 is locked by the detent pin 14 to the collet 4. During this unfastening operation, if the diaphragm ring 5 is left set to any value of aperture larger than the minimum one, i.e., 1.4, then when the drive member 23 is brought into driving engagement with the extension 11b at a corresponding point in the range of movement thereof it pushes the extension 17b against the force of the drive spring 19 until the transmission arm 11a is returned to its initial position. Thus, the detached unit when again in use will be easy to handle in establishing operative connection between the diaphragm mechanism in the lens unit and the control device therefor in the camera body. The term "operative connection" herein does not necessarily mean an intimate contact but any spatial relationship which assures later operative connection between the lens unit and the camera body not only directly but through intermediary means such as mechanical switches, variable resistors and electrical contacts.

As is evident from the above, all that need be accomplished in establishing accurate and reliable cooperation between the diaphragm and the control device therefor has to do with the achievement of angular alignment of the unit relative to the camera body. Further, because no frictional action occurs between the adapter shell 8 and the camera housing during the coupling operation, no error due to wear takes place in the mechanical and optical coordination of the unit and camera body, which error would be otherwise encountered by damage resulting from abrasion and scratching at the bearing surfaces of the lens unit and camera body. Furthermore, the collet or ring 4 which in some prior art device is constructed in the form of a movable coupling member is fixedly secured to the main support tube or lens barrel 1 to permit the operator to grasp any part of the lens barrel 1 or of the operative components mounted thereon in order to effect a coupling operation. Thus, the accessibility to the coupling device is greatly improved without sacrificing the accuracy and reliability of diaphragm control in the complete camera.

The operational mechanical mounting for the coupling device has been described in connection with a purely schematic example which of course can be changed in many ways. For example, instead of a pair of mating bayonet members 6 and 25, it is possible to use male and female screw threads. In this case, it is recommended that the helix angle be specified to a value such that the required magnitude of the tightening motion of the unit relative to the stationary camera body does not exceed one revolution. Instead of a position control pin 10, it is possible to utilize one of the control members C1 and C2 in defining the angular position of the adapter shell relative to the camera body. In this case, provision must be made for assuring reestablishment of the initial angular position of the adapter shell relative to the main support tube when the unit is detached from the camera body. Instead of a main support tube 1, it is possible to utilize a diaphragm ring 5 in driving a bayonet or screw thread coupling member for rotation to bring the unit into tightened engagement with the camera body. This is exemplified in FIG. 10, wherein the same reference numerals have been employed to denote similar and like parts to those shown in FIGS. 1 to 9.

Figure 10:
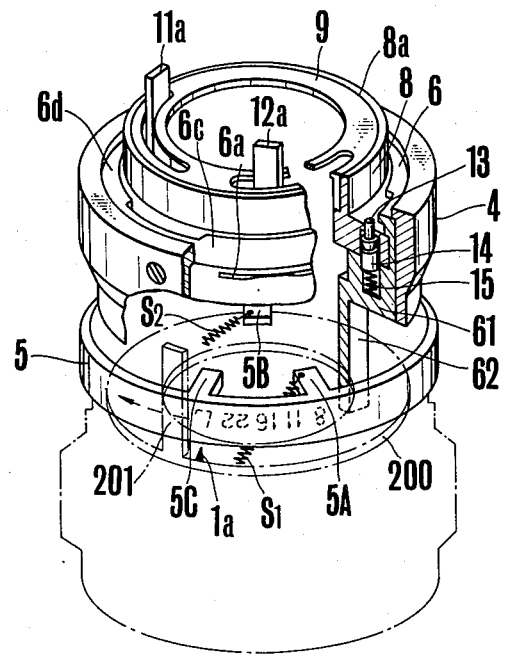
FIG. 10 is a fragmentary partly perspective partly sectional view of another example of the actuating mechanism for the coupling device.

In FIG. 10, the collet 4 remains unchanged from the fixedly secured relation to the main support tube or lens barrel 1. The coupling member 6 is formed integrally with a rotatable sleeve 61 which is fixedly fitted onto the inner surface of the collet 4 by means of screws or the like with the adapter shell 8 being rotatably fitted in an inner circumferential recess of the support sleeve 61. The support sleeve 61 has an arm downwardly or forwardly extending into either of the paths of movement of two radial projections 5A and 5B of the diaphragm ring 5. Thus, when the diaphragm ring 5 is turned beyond the lower limit (minimum size of aperture) of a range of diaphragm values, the first projection 5A is brought into driving engagement with the arm 62 to rotate the bayonet ring 6 in a tightening direction provided that the lock mechanism 13, 14 and 16 is in the idle position. When the diaphragm ring 5 is turned beyond the upper limit of the diaphragm value range, the second projection 5B is brought into driving engagement with the arm 62 to rotate the bayonet ring 6 in an unfastening direction opposite to the tightening direction. So long as the diaphragm ring 5 is allowed to stand in registry at any one of the available diaphragm values with the stationary index mark 1a, an operative engagement between a lug 5C of the diaphragm ring 5 and an upwardly extending projection 201 of a cam ring 200 is established, the parts 5c, 200 and 201 corresponding to those 5a, 17 and 17b of FIGS. 3 and 6. In order to absorb the tightening and unfastening movement of the diaphragm ring 5 relative to the cam ring 200, there is provided two tension springs S1 and S2 connected between the projections 5A and 5B and the common ring 200 respectively. The spring S2 also serves to effect the aforesaid operative engagement between the lug 5c and the projection 201.

Since the elements of the lens unit including the main support tube or lens barrel 1, the bayonet member 6, the sleeve 61, the collet 4 form a rotatable assembly which is rotatable with respect to the adapter shell 8 and therefore to the camera body through an angular extent of about 60 degrees or more depending upon the structure of the retaining mechanism 11, 18 and 23 of the invention, it is required to provide a somewhat strong click mechanism between the this rotatable assembly and the adapter shell. Otherwise operations of the focusing ring 2 and the diaphragm ring 5 will be difficult to perform, as the complete camera is held by hand at the body thereof. The free rotation of the rotatable assembly relative to the camera housing gives rise to an advantage that the attitude of the camera may be in either of the vertical and horizontal directions, while the index mark 1a is maintained in an upwardly facing position, making it easy to view the distance and diaphragm indicia.

Figure 11:
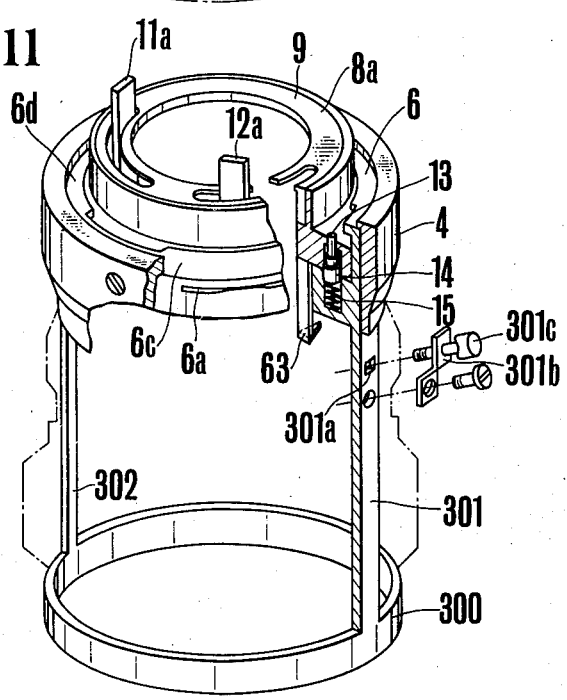
FIG. 11 is a fragmentary partly perspective partly sectional view of still another example of the actuating and locking mechanism for the coupling device.

Instead of utilizing the diaphragm ring 5 as an actuating member for the coupling member 6, it is possible to provide an independent actuating member as shown in FIG. 11. This actuating member is constructed in the form of a forwardly elongated portion 300 of the rotatable assembly fixedly fitted thereon. This portion or sleeve 300 is fixedly connected to the bayonet support sleeve 61 by way of a pair of rearwardly extending arms 301 and 302. If desired, a lock mechanism of the same function as that shown in connection with the FIGS. 7 to 9 may be provided not only on the unit of FIG. 11 but also on that of FIG. 10. This may comprise a detent hole 301a formed in the arm 301, a pawl member 63 fixedly mounted on the adapter shell 8 and arranged so that when the coupling member 6 has reached a fully tightening position the pawl 63 enters the detent hole 301a, and an actuating member 301c biased by a plate spring 301b whose one end is fixedly carried on the arm 301 and arranged in alignment with the detent hole 301a upon depression to effect disengagement of the pawl 63 from the hole 301a.

Figure 12:
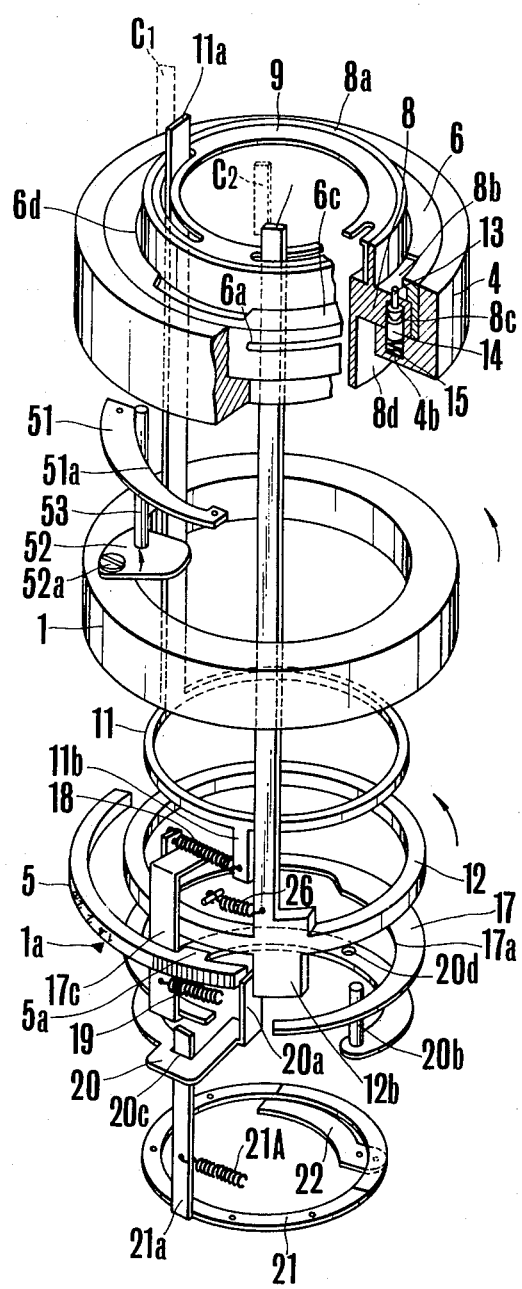
FIG. 12 is an exploded perspective view of another embodiment of the invention applied to the unit wherein the range of movement of the transmission arm of the diaphragm setting means is larger than that of movement of the coupling device and lens barrel.

Referring to FIG. 12, there is shown another embodiment of the present invention applied to a mechanical mounting unit in which the extent of annular movement which must be effected by the rotatable assembly comprising the lens barrel 1 relative to the camera housing in order to effect coupling of the lens unit is smaller than that of angular movement of any one of the transmission members 11a and 12a in returning to their initial predetermined positions. In this connection, it should be noted that with a smaller required angular movement of the lens barrel 1, the coupling operation is quicker and easier to perform, while with larger angular movement of the diaphragm control signal transmission member 11, the accuracy of diaphragm control can be effected at a higher level. A problem arising with the embodiment having this feature is that it is not always possible to control retention of the transmission member 11a at the initial position after the unit is detached from the camera body. This second embodiment of the invention is adapted to obviate such problem.

To achieve this, there is provided an accelerating device for moving the diaphragm responsive transmission member 11a at a faster rotative speed and through a greater extent of angular movement than that of the main support tube or lens barrel 1, said device including a cam member 51 fixedly mounted on the bottom surface 8d of the adapter shell 8 and having a camming surface formed on the radially inner side edge thereof in such a configuration that the distance between the axis of the tube 1 and a point at which a radius from that axis intersects the outline of the camming surface 51a is increased with increase in angle as measured in a clockwise direction as viewed from the front of the lens assembly or camera in FIG. 12. This device further includes a lever 52 fulcrumed at a pin 52a axially upwardly or rearwardly extending from the main support tube 1, and a longitudinally elongated cam follower pin 53 fixedly mounted on the lever 52 at a nearer distance to the pivot pin 52a than distances of the cam follower pin 53 to points at which the transmission member 11a abuts against the lever 52 while slidably moving thereon.

With the diaphragm ring 5 turned to the minimum diaphragm value, in this instance, F/1.4, in registry with the index mark 1a, when the tube 1 is turned in a counter-clockwise direction indicted by an arrow from the illustrated position to a fully tightened position, the projection 17c of the diaphragm presetting cam ring 17 is moved to engage with the lug 11b of the diaphragm responsive ring 11 which is maintained stationary therethrough by the absorbing action of the spring 18 to retain the arm 11a in the illustrated initial position. During this tightening operation, the accelerating device is moved away from the transmission arm 11a with simultaneous occurrence of clockwise movement of the lever 52 about the pivot pin 52a. As long as the diaphragm ring 5 assumes a setting position in an angular extent beginning with the minimum value, i.e., 1.4 and equal to that of tightening movement of the tube 1, the aforesaid problem does not take place.

Now assuming that the diaphragm ring 5 is left set either in the maximum possible value, or in "EE" position, when the tube is turned in a unfastening direction for the purpose of detaching the unit from the camera body, the lever 52 is brought into driving engagement with the arm 11a and moves the latter at a faster angular speed than that of movement of the tube 1, as the lever 52 is turned in a counterclockwise direction indicated by an arrow by the cam follower pin 53 acting on the stationary cam member 51 against the force of the drive spring 19 for the diaphragm presetting cam ring 17. At the termination of unfastening movement of the tube 1, the arm 11a arrives at the initial position, where the tube 1 is locked to the adapter shell 8 by the detent pin 14 to prevent the accelerating device from being driven for movement with the arm 11a by the force of the charged spring 19 which is directly applied to the device because of the displacement of the lug 1a from the projection 17c.

Figure 13:
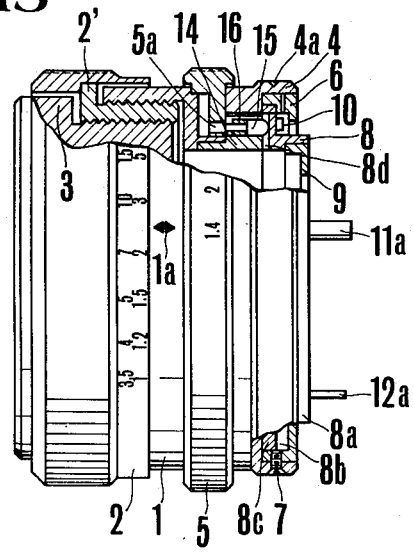
FIGS. 13 to 15 show still another embodiment of the invention, with FIG. 13 being a partly side elevational partly sectional view of a unit, with FIG. 14 being a rear elevation of the unit of FIG. 13, and with FIG. 15 being an exploded perspective view of a diaphragm presetting and closing down mechanism shown with the lens assembly in the detached position.
Figure 14:
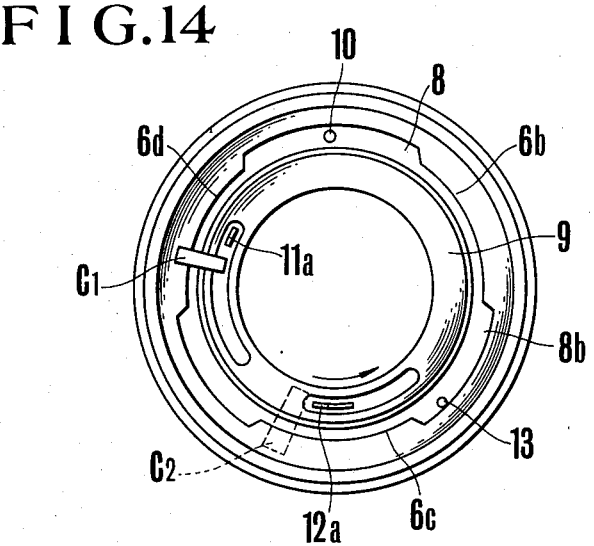
Figure 15:
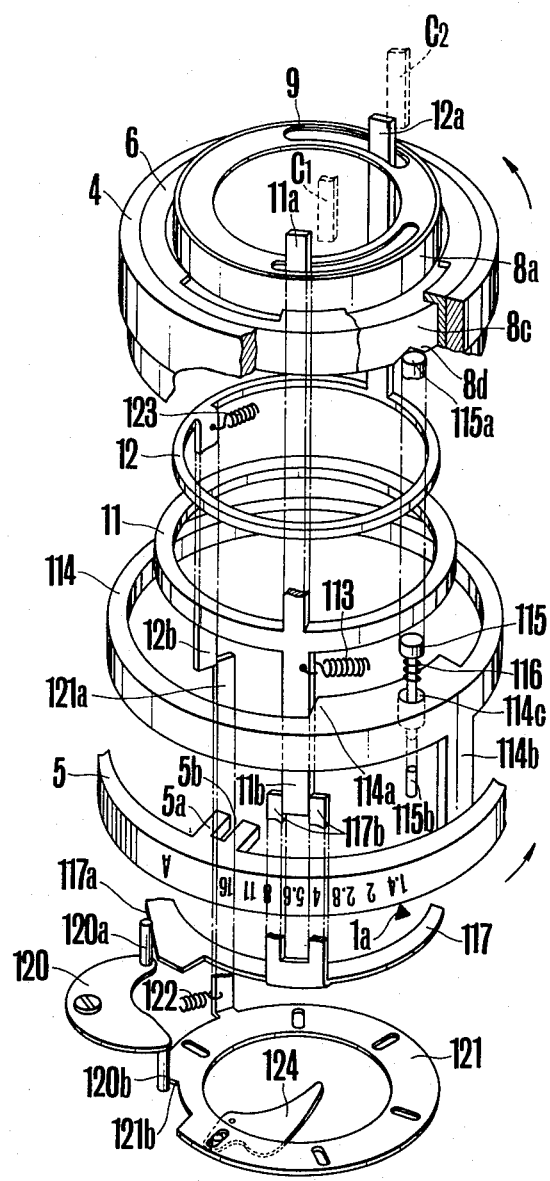

FIGS. 13 to 15 show a third embodiment of a detachable operational mechanical mounting unit according to the invention including a lens barrel 1 on which a distance adjusting sleeve 2 is rotatably slidably fitted, a front lens cell 3 in which a focusing member of a camera objective is fixedly mounted, said cell 3 being restrained from rotation during focusing, a collet 4 fixedly secured to the rear end of the barrel 1, a diaphragm ring 5 rotatably fitted on the barrel 1 adjacent the front end of the collet 4 and restrained from axial movement, a female coupling member of the bayonet type 6 fitted onto the inner diameter of the collet 4 and fixedly secured thereto by fasteners 7, and an adapter shell 8 having a rearwardly elongated tubular portion 8a of an outer diameter equal to the inner diameter of a bore formed in the front panel of the camera housing and around which a male bayonet coupling member is formed on the front panel. The adapter shell 8 is provided with a radial flange formed in the front end thereof and freely fitted onto the inner diameter of a tubular portion of the female coupling member 6. The rear radial shoulder 8b of the flange 8c serves as an abutment surface when the unit is attached to the camera body, while the front radial shoulder 8d is seated against an inturned radial flange of the collet 4. Positioned on the abutment surface 8b of the adapter flange 8c are an angular relative position defining pin 10 and an adapter locking control pin 13, these parts having the same functions as those denoted by the same reference numerals in FIGS. 1 and 2.

The unit further includes a diaphragm presetting and closing down mechanism with transmission arms 11a and 12a projecting through and outwardly beyond respective arcuate slots concentric to each other and formed in a common rear end crosswall 9 of the adapter shell 8 in angularly spaced relation as shown in FIG. 14. In the complete camera, while the arm 12a is located adjacent a control member C2 therefor, the arm 11a in the initial position is located at a distance from a control member C1 for a purpose to be described later. The arm 11a extends upwardly or rearwardly of a ring 11 rotatably slidably supported on the adapter shell 8 and having another arm 11b downwardly extending into a slot formed in an upward extension 117b of a presetting control cam ring 117 and freely fitted therein. A drive spring 113 is connected between the arm 11b and the adapter shell 8 to allow the entire range of movement of the transmission ring 11 together with the cam ring 117. The extension 117b is located to permit movement of a lug 5a of the diaphragm ring 5 thereover. Positioned between the transmission ring 11 and the diaphragm ring 5 is an intermediate ring 114 rotatably supported in the barrel 1 and having an inturned radial lug 114a arranged adjacent the arm 11b so that when the unit is in the detached position, the transmission arm 11a is retained in the initial position. With the diaphragm ring 5 set in "A" position beyond the range of diaphragm values available on the peripheral surface thereof, in other words, in proper alignment at a symbol "A" with an index mark 1a, when the lens barrel 1 is turned about the axis thereof in a direction indicated by arrows in FIG. 15 to the fully tightened position, the lug 114a is moved away from the transmission arm 11b to permit automatic adjustment of the cam ring 117 in position.

The intermediate ring 114 is provided with an anchor or clutch means in the form of a pin 115 having a round head 115a formed at one end thereof, the opposite end of which projects through a slidably fitted axial hole 114c formed in the body of the ring 114 and downwardly therebeyond to such an extent that when the barrel 1 is turned in the tightening direction to bring the lug or bifurcated member 5a into abutting engagement with a downwardly extending projection 114b of the intermediate ring 114, the pin 115 is aligned to a detent slot 5b formed in the lug 5a. Upon further slight rotative movement of the barrel 1, the intermediate ring 114 is driven for rotation with simultaneous occurrence of downward movement of the anchor pin 115 away from the recess 8d of V-shape profile formed in the bottom surface 8d of the adapter shell 8 against the force of a bias expansion spring 116, as a sufficiently strong click mechanism is provided between the diaphragm ring 5 and the base barrel 1. Such downward movement of the anchor pin 115 causes driving engagement of the diaphragm ring 5 at the slot 5b with the intermediate ring 114 at the end 115b of the anchor pin 115.

The diaphragm closing down mechanism includes a transmission ring 12 having the aforesaid arm 12a and rotatably slidably supported on the adapter shell 8, a retaining tension spring 123 connected between a downwardly extending arm 12b of the transmission ring 12 and the adapter shell 8 to maintain a diaphragm blade control ring 121 normally stationary in an aperture fully open position by engagement of the arm 12b with an upward projection 121a against the force of a drive spring which tends to move the diaphragm blade control ring 121 in a closing down direction, and a bellcrank 120 whose shaft is mounted on the barrel 1 and which has a cam follower pin 120a fixedly mounted thereon and engaged with a camming surface 117a of the presetting control ring 117 to control arrestment of the ring 121 in accordance with the position of the cam ring 117 by a pin 120b which is fixedly mounted on the bell crank 120 and projects into a space in a recess 121b formed in the ring 121.

In operating the unit of such structure, the operator will first look for axial alignment of an index mark 4a provided on the outer periphery of the collet 4 with a corresponding mark (not shown) provided on the camera housing. Then the unit at the rear end 8a of the adapter shell 8 is inserted into the bore until the abutment surface 8b contacts with the bearing surface of the camera housing, while the pin 10 enters a slidably fitted hole provided on the camera housing simultaneously and the lock control pin 13 is also actuated to release the adapter shell 8 from locking connection with the lens barrel 1. The barrel 1 is then turned about the axis of the lens therein with respect to the stationary camera housing. During this tightening operation, the adapter shell 8 is maintained stationary relative to the camera housing.

Now assuming that the diaphragm ring 5 is initially set in an extreme position for the minimum diaphragm value, i.e., 1.4 as shown in FIG. 15, when the lens barrel 1 nears the terminal end of tightening movement, the lug 5a abuts against the projection 114b. Upon further movement of the lens barrel 1 through a length equal to or slightly larger than the above noted distance between the arm 11a and the control member C1 shown in FIG. 14, the anchor pin head 115a comes to ride on the smooth surface adjacent the recess 8d of the radial flange 8c and the arm 11a is brought into operative engagement with the control member C1. At the termination of length of such additional tightening movement, the lens barrel 1 is stopped from further rotation by means such as those shown in FIGS. 7 to 9. After that, the diaphragm ring 5 may be turned to place a desired diaphragm value in registry with the index 1a, causing the transmission ring 11 to follow up the intermediate ring 114 under the action of the spring 113 which does not result in disengagement of the ring 114 from the ring 5 because of the anchor pin end 115b engaging in the slot 5a. When the complete camera is switched to a shutter preselection automatic diaphragm control mode by turning the diaphragm ring 5 to place the symbol "A" in registry with the index 1a, the arm 11a is displaced to the opposite terminal end of the slot 9 so that the cam ring 117 is adjusted to an automatic setting from a position corresponding to the fully closed aperture in an opening up direction.

When the shutter release button is depressed, the control member C2 is actuated to move in a counterclockwise direction as viewed in FIG. 14, and such movement of the member C2 is transmitted through the ring 12 to the diaphragm blade control ring 121, and the ring 121 is thereby driven by the spring 122 which is weaker than the spring 123, as the arm 12b is moved away from the extension 121a. After an exposure has been completed, the control member C2 returns to the initial position, while permitting the diaphragm blades to be moved to the full open position under the action of the spring 123 which has overcome the spring 122.

It it is desired to interchange the unit with another one of different rating, the operator need only push the button 101 (see FIG. 7) and then turn the lens barrel in the unfastening direction without the necessity for being aware of the setting position the diaphragm ring 5 is to assume. With the diaphragm ring 5 in "A" position, when the barrel 1 is turned from the fully tightened position, through an angular extent equal to that of the effective operating range of the diaphragm ring from a graduation, 1.4, to the symbol "A", the control member C1 is just stopped from further movement. Upon further unfastening movement, through the distance above noted in FIG. 14, the head 115a of the anchor pin 115 drops into the recess 8d under the action of the spring 116, and the transmission arm 11a is thereby retained in the initial position against the force of spring 113. After that, the lens barrel 1 may be further turned in the unfastening direction through as long a length as desired, provided that the coupling member 6 can be disengaged from the mating one. Thus, the unit can be easily interchanged with another one of different focal length rating. Another advantage is that the design flexibility of the coupling device is increased allowing an angular extent of tightening movement of the unit to be increased as desired without introducing overstress to the diaphragm transmission mechanism.

While specific embodiments of the invention have been shown and described in detail to illustrate the application of the inventive principles, it will be understood that the invention may be embodied otherwise without departing from such principles.

What is claimed is:

1. An assembly wherein said compensating means comprises a compensation member pivotally mounted on the lens barrel body, a cam member fixedly mounted on said adapter member and having a camming surface for engagement with the elongated portion of the transmission means, whereby when the lens barrel is detached from the camera body, the compensation member is moved in engagement with the camming surface of the cam member and at the same time pushes the transmission means at the elongated portion thereof to return the transmission means to the initial position.

2. An interchangeable lens assembly for a camera including a camera body comprising:
   (a) a lens barrel having a photo-taking lens for forming an image of an object to be photographed and a diaphragm device for controlling light entering through said photo-taking lens mounted therein;
   (b) attachment tightening means having coupling means fixedly mounted on the lens barrel and arranged upon attaching and tightening operation with the camera body to engage with a coupling member provided on the camera body whereby the lens barrel and the camera body are connected with each other;
   (c) diaphragm setting means adjustably fitted on the lens barrel and having a diaphragm value scale formed thereon in cooperation with an index on the lens barrel;
   (d) diaphragm presetting means arranged to operatively engage with the diaphragm setting means and the diaphragm device;
   (e) transmission means for transmitting a diaphragm signal to the diaphragm device from the diaphragm setting means or the camera body;
   (f) intermediate means arranged in the lens barrel to be rotatable relative thereto and having a signal conversion part formed thereon responsive to at least one of said diaphragm setting means and diaphragm control means provided in said camera, at least one part thereof transmitting a signal corresponding to the diaphragm value set by the diaphragm setting means to the diaphragm device;
   (g) operating means for adjusting the diaphragm device to a size of opening corresponding to a set diaphragm signal so as to operate the diaphragm device in accordance with the set diaphragm signal from the diaphragm setting means; and
   (h) adapter means restrained from rotational movement in the lens barrel and made rotatable relative thereto during mounting of said interchangeable lens assembly on said camera, said adapter means having an abutment surface for the camera body and operative to permit transmission therethrough of a diaphragm signal to and from the camera body.

3. An assembly according to claim 2, further including:

charge means having a charge member fixedly mounted to said lens barrel and arranged to be engageable with one end part of said intermediate means when said lens barrel is turned, whereby said transmission means is brought into a standard position through said intermediate means by rotative operation of said lens barrel.

4. An interchangeable lens assembly for a camera including a camera body with mating coupling means comprising:
   (a) lens barrel means including a photo-taking lens for forming an image of the object to be photographed and a diaphragm device for controlling light entering through said photo-taking lens, with coupling means being mounted in fixedly secured relationship on an end of said lens barrel means;
   (b) diaphragm setting means rotatably mounted on said lens barrel means with an engagement portion engageable with a part of said lens barrel means;
   (c) transmission means for transmitting a diaphragm signal to and from said camera, said transmission means being operatively connected with said diaphragm setting means and said diaphragm device;
   (d) adapter means connected with said lens barrel means in rotatable relationship therewith, said adapter means being arranged to be restrained from the rotational movement relative to said camera, and to enable transmission therethrough of a diaphragm signal to said camera by said transmission means, coupling of said lens barrel means with said camera being effected through relative movement between said coupling means of said lens barrel means and said mating coupling means of said camera side by grasping of said diaphragm setting means.

5. An assembly according to claim 4, further comprising:
   locking means having a lock member movably mounted between said adapter means and said lens barrel means, said adapter means and said lens barrel means being maintained in a locked state by said lock member, said locked state being released to allow relative rotation between said adapter means and said lens barrel means when attachment of said lens assembly is effected.

6. An assembly according to claim 5, further comprising:
   lens lock means having a lock operating means movably arranged between said lens barrel means and said adapter means, said lens lock means being prohibited from allowing relative rotation of said lens barrel means and said adapter means when said lens barrel means is rotated to a predetermined position.

7. An assembly according to claim 6, further comprising:
   lens lock release means having bias means engaging with said lock operating means and urging said lock operating means in one direction.

8. An assembly according to claim 7, further comprising:
   resilient means installed with said tightening means to provide a sturdy connection between said lens assembly and said camera body established in the locked state of said locking means.

9. An interchangeable lens assembly for a camera including a camera body comprising:

(a) a lens barrel which has a photo-taking lens for forming an image of an object to be photographed and a diaphragm device for controlling light entering through said photo-taking lens:

(b) diaphragm setting means adjustably fitted on the lens barrel and having a diaphragm value scale formed thereon in cooperation with an index;

(c) diaphragm presetting means arranged to operatively engage with the diaphragm setting means and the diaphragm device, and having signal conversion means for presetting the diaphragm device to a size of opening corresponding to a set diaphragm signal;

(d) transmission means for transmitting diaphragm signals between the lens assembly and the camera body;

(e) operating means for driving the diaphragm device based on a signal from the camera body so as to operate the diaphragm device in accordance with the preset diaphragm signal by said signal conversion means;

(f) attachment tightening means having a coupling member fixedly mounted on the lens barrel and arranged upon attaching and tightening operation with the camera body to engage with a coupling member provided on the camera body, whereby the lens barrel and the camera body are connected with each other;

(g) an adapter member restrained from axial movement in the lens barrel and made rotatable relative thereto, and having an abutment surface for the camera body and at the same time having an opening in which said transmission means moves at its portion elongated in the direction in which the lens is attached to the camera body; and (h) compensating means for compensating the difference between the motion of said lens barrel and the motion of said transmission means, said compensating means being arranged to engage with said transmission means when the lens barrel is attached to and detached from the camera body, whereby the elongated portion of the transmission means is moved to a predetermined position in an opening of said adapter member.

10. An interchangeable lens assembly for a camera including a camera body and coupling means comprising:

(a) frame means having a portion defining an opening within which there is arranged exposure defining means for controlling light output through said opening, and having tightening means rigidly fixed on said frame means and formed for mating relationship with said coupling means;

(b) association means mounted in said lens assembly and operatively connected with said exposure defining means, and having a predetermined range of motion;

(c) adapter means arranged to be restrained from movement relative to said coupling means in cooperation with said camera when said frame means is rotated by an operator to effect fixing thereof on said camera; and (d) means for allowing relative movement of said frame means corresponding to the difference between the motion of said frame means and the motion of said association means, the motion of said frame means being thereby permitted when said frame means is rotated over a predetermined range of motion of said association means to disengage said coupling means with said tightening means.

11. An assembly according to claim 10, further comprising:
locking means having a movable lock member to maintain said adapter means and said frame means in a locked state.

12. An assembly according to claim 11, further comprising:
lens lock means having operating means movably arranged between said frame means and said adapter means, said frame means being prohibited from allowing relative rotation of said frame means and said adapter means, when the frame means is rotated to a predetermined position.

13. An assembly according to claim 12, further comprising:
lens lock release means having bias means engaging with said lock operating means and urging said lock operating means in one direction.

14. An assembly according to claim 13, further comprising:
resilient means installed with said tightening means to provide a sturdy connection between said lens assembly and said camera body established in the locked state of said locking means.

15. An interchangeable lens assembly for a camer including a camera body with coupling means comprising:

(a) lens barrel means having mounted therein a phototaking lens for forming an image of an object to be photographed and a diaphragm device for controlling light entering through said phototaking lens, said lens barrel means having a tightening portion formed rigidly thereon for mating relationship with said coupling means;

(b) diaphragm setting means rotatably mounted on said lens barrel means and operatively connected with said diaphragm device;

(c) transmission means operatively connected with said diaphragm device for transmitting diaphragm signals between said lens assembly and said camera body; and (d) adapter means connected with said lens barrel means in rotatable relationship therewith and including an abutment surface forming an optical reference surface, said adapter means being adapted to be brought into abutting relationship with said camera body during mounting of said lens assembly on said camera body, said adapter means further including position defining means operative in cooperation with complementary position defining means on said camera for restraining said adapter means from rotational movement relative to said camera body while said lens barrel means is rotated to effect mating engagement between said tightening portion and said coupling means for fixing said lens assembly on said camera body, said adapter means being arranged to enable transmission therethrough of said diaphragm signals by said transmission means between said camera and said lens assembly; and (e) a tightening ring formed so as to rotate in unison with said lens barrel means through an elongated portion contiguous to one portion of said lens barrel means and having an outer peripheral surface enlarged relative to the outer peripheral surface of said lens barrel means to facilitate attachment of the lens assembly to the camera body by grasping of said enlarged portion.

16. An interchangeable lens assembly for a camera including a camera body with coupling means comprising:
   (a) lens barrel means having mounted therein a phototaking lens for forming an image of an object to be photographed and a diaphragm device for controlling light entering through said phototaking lens, said lens barrel means having a tightening portion formed rigidly thereon for mating relationship with said coupling means;
   (b) diaphragm setting means rotatably mounted on said lens barrel means and operatively connected with said diaphragm device;
   (c) transmission means operatively connected with said diaphragm device for transmitting diaphragm signals between said lens assembly and said camera body; and
   (d) adapter means connected with said lens barrel means in rotatable relationship therewith and including an abutment surface forming an optical reference surface, said adapter means being adapted to be brought into abutting relationship with said camera body during mounting said lens assembly on said camera body, said adapter means being arranged to be restrained from rotational movement relative to said camera body while said lens barrel means is rotated to effect mating engagement between said tightening portion and said coupling means for fixing said lens assembly on said camera body, said adapter means being arranged to enable transmission therethrough of said diaphragm signals by said transmission means between said camera and said lens assembly; and
   (e) position definig means for said adapter means having a projection member on said adapter means and arranged upon attachment to said camera body to engage in a fitted recess provided in an attachment bearing surface of said camera body, said adapter means being thereby maintained stationary at a predetermined position relative to said camera body during coupling operation.

17. An assembly according to claim 16, further including: locking means having a lock member movably arranged between said adapter means and said lens barrel means, said adapter means and said lens barrel means being maintained in a locked state by said lock member, said locked state being released to allow relative rotation between said adapter means and said lens barrel means when an attachment operation of said lens assembly is effected.

18. An assembly according to claim 16, further comprising:
lens locking means having a lock operating member movably supported between said lens barrel means and said adapter means, said lock operating member prohibiting relative rotation between said lens barrel means and said adapter means when said lens barrel means is rotated to a predetermined position.

19. An assembly according to claim 18, wherein said lens locking means includes lens lock release means having bias means engaging with said lock operating member and urging said lock operating member in one direction.

20. An interchangeable lens assembly for a camera including a camera body, camera coupling means, exposure control means and a driving member comprising:
   (a) a lens barrel having a photo-taking lens for forming an image of an object to be photographed, a diaphragm device for controlling light entering through the photo-taking lens, and lens barrel coupling means rigidly fixed on an end of said lens barrel and formed for mating relationship with said camera coupling means;
   (b) diaphragm setting means rotatably mounted on said lens barrel and operatively connected with said diaphragm device;
   (c) diaphragm presetting means arranged to operatively engage with said diaphragm setting means for presetting a diaphragm signal thereby to operate said diaphragm device;
   (d) transmission means which transmit a diaphragm signal between a lens side and a camera side, said transmission means being connectable to said exposure control means of said camera for transmitting a diaphragm signal from the camera side to the lens side;
   (e) driving means connectable to said driving member for actuating said diaphragm device in response to a preset signal of said diaphragm presetting means;
   (f) adapter means arranged to be engaged with said camera body to be restrained from movement relative thereto and being rotatable relative to the lens barrel, said adapter means being arranged to allow the movement of said transmission means and said driving means therethrough;
   (g) engaging means having means for connecting said diaphragm setting means and said transmission means in response to mating operation of the rotation of the lens barrel relative to said adapter means during mounting of said lens assembly on said camera, said connecting means being actuated to transmit the set diaphragm value information of said diaphragm setting means to said transmission means, said engaging means having a rotary member rotative relative to said lens barrel and engageable with said transmission means, and a lock member freely fitted in a hole provided through the wall of said rotary member so that said lock member is engageable with at least one of the diaphragm setting means and said adapter means when the lens barrel is operated to be tightened.

21. An interchangeable lens assembly for a camera comprising:
lens barrel means including diaphragm means mounted therewith;
coupling means fixed on said lens barrel means adapted to be brought into engagement with complementary coupling means on said camera for releasably mounting said lens assembly in operative position on said camera;
adapter means mounted on said lens barrel means in rotative relationship relative thereto for establishing predetermined relative positioning between said interchangeable lens assembly and said camera;
retainer means adapted to be interposed between said adapter means and said camera for retaining said adapter means in fixed rotative position relative to said camera during mounting and dismounting of said interchangeable lens assembly;

diaphragm setting control means adapted to be brought into operative engagement with said camera when said lens assembly is mounted in operative position on said camera; and means for returning said diaphragm setting control means to a predetermined position when said lens assembly is dismounted from said camera.

22. An interchangeable lens assembly according to claim 21 wherein said lens barrel means and said coupling means are rotated together through a predetermined angular distance relative to said adapter means and said camera when mounting and dismounting said lens assembly, and wherein said diaphragm setting control means must be rotated through a greater angular distance than said lens barrel means in order to be returned to said predetermined position when said lens assembly is dismounted from said camera, said means for returning said diaphragm setting control means to said predetermined position comprising eccentric cam means interposed between said lens barrel means and said diaphragm setting control means to enable said lens barrel means to drive said diaphragm setting control means through said greater angular distance when said lens barrel means is located to dismount said lens assembly.

23. An interchangeable lens assembly according to claim 22 wherein said eccentric cam means comprise a cam member affixed to said adapter means and having a cam surface extending eccentrically relative to the axis of rotation of said lens assembly and a cam follower member pivotably mounted on said lens barrel means and arranged for engagement with said eccentric cam surface to drive said diaphragm setting control means through said greater angular distance.

24. An interchangeable lens assembly for a camera comprising:

lens barrel means having lens operative component means mounted therewith;

coupling means fixed on said lens barrel means adapted to be brought into engagement with complementary coupling means on said camera for releasably mounting said lens assembly in operative position on said camera;

adapter means mounted on said lens barrel means in rotative relationship relative thereto for establishing predetermined relative positioning between said interchangeable lens assembly and said camera;

retainer means adapted to be interposed between said adapter means and said camera for retaining said adapter means in fixed rotative position relative to said camera during mounting and dismounting of said interchangeable lens assembly;

first releasably locking means for rotatively locking said adapter means and said lens barrel means together at a first predetermined relative angular position when said lens assembly is dismounted from said camera; and second releasable locking means for rotatively locking said adapter means and said lens barrel means together at a second predetermined relative angular position when said lens assembly is mounted in operative position on said camera.

25. An interchangeable lens assembly for a camera comprising:

lens barrel means including diaphragm means mounted therewith, said diaphragm means being operative to define a lens aperture for said camera;

coupling means fixed on said lens barrel means adapted to be brought into engagement with complementary coupling means on said camera for releasably mounting said lens assembly in operative position on said camera;

adapter means mounted on said lens barrel means in rotative relationship relative thereto for establishing predetermined relative positioning between said interchangeable lens assembly and said camera;

retainer means adapted to be interposed between said adapter means and said camera for retaining said adapter means in fixed rotative position relative to said camera during mounting and dismounting of said interchangeable lens assembly;

diaphragm operating means for driving said diaphragm means when said camera is actuated;

diaphragm setting control means operatively associated with said diaphragm operating means for controlling operation of said diaphragm means to effect a predetermined lens aperture set on said diaphragm setting control means; and means for returning said diaphragm operating means and said diaphragm setting control means to respective predetermined positions relative to said adapter means when said lens barrel means is rotated relative to said adapter means for dismounting said lens assembly from said camera.

26. A lens assembly according to claim 25 further comprising:

slot means formed in said adapter means having said diaphragm setting control means and said diaphragm operating means extending therethrough for operative engagement with said camera when said lens assembly is mounted thereon;

said slot means including abutment means against which said diaphragm operating means and said diaphragm setting control means are held when in said respective predetermined positions;

said returning means comprising means placing said diaphragm setting control means in driven engagement with said lens barrel means when said lens barrel means is rotated relative to said adapter means for dismounting said lens assembly, first spring means biasing said diaphragm setting control means away from said abutment means and second spring means biasing said diaphragm operating means toward said abutment means.

27. A lens assembly according to claim 26 wherein said means placing said diaphragm setting control means in driven engagement with said lens barrel means comprise cam ring means arranged to form part of said diaphragm setting control means and including an adjustably rotatable cam ring having a cam surface formed thereon, said cam surface being engaged by a cam follower on said diaphragm operating means to determine the lens aperture effected by said diaphragm means in accordance with the relative angular position of said cam ring.

28. A lens assembly according to claim 26 wherein said diaphragm setting control means include a transmission member extending through said slot means for transmitting diaphragm signals representing a lens aperture between said camera and said lens assembly, wherein said first spring means are operatively interposed between said cam ring means and said lens barrel means, and wherein said cam ring means are placed in driving engagement with said lens barrel means during dismounting of said lens assembly to drive said transmission member against said abutment means.

29. A lens assembly according to claim 28 wherein said diaphragm setting control means further comprise a manually operable diaphragm ring rotatably mounted on said lens barrel means for enabling a desired lens aperture to be set by an operator, and means for placing said diaphragm ring in driving engagement with said cam ring means upon rotation of said diaphragm ring in a given direction, said second spring means operating to maintain said cam ring means in abutting engagement with said diaphragm ring.

30. A lens assembly according to claim 27 wherein said cam ring means are arranged to be rotatively driven by said lens barrel means when said lens barrel means are rotated beyond a predetermined angular position relative to said adapter means when mounting said lens assembly on said camera, said lens assembly further comprising third spring means interposed between said cam ring means and said transmission member.

31. A lens assembly according to claim 26 wherein said second spring means are operatively interposed between said lens barrel means and said diaphragm operating means, said second spring means being structured to maintain a spring force holding said diaphragm operating means against said abutment means through the full range of angular motion of said lens barrel means relative to said adapter means when mounting and dismounting said lens assembly.

32. A lens assembly according to claim 26 wherein said diaphragm setting control means comprise a transmission member extending through said slot means for transmitting diaphragm signals representing a lens aperture between said camera and said lens assembly, and a manually operable diaphragm ring mounted on said lens barrel means for rotation relative thereto between two terminal positions for enabling a desired lens aperture to be set by an operator, said diaphragm ring operating to rotate together with said lens barrel means when said lens assembly is mounted on said camera, and wherein said means placing said diaphragm setting control means in driven engagement with said lens barrel means comprise an intermediate ring having an abutment surface thereon adapted to engage said transmission member to drive said transmission member against the face of said first spring means against said abutment means, said lens assembly further comprising clutch means to place said intermediate ring in positive locking engagement with said diaphragm ring when said lens assembly is mounted on said camera and to release said positive locking engagement when said lens assembly is dismounted.

33. A lens assembly according to claim 32 wherein said clutch means comprise pin means extending through said intermediate ring and axially movable relative thereto, said pin means having one end adapted to positively engage said diaphragm ring and a second end adapted to enter a recess formed in said adapter means, and spring means biasing said pin into said recess, said diaphragm ring including bifurcated means for placing said diaphragm ring in abutting driving engagement with said intermediate ring when said lens assembly is mounted on said camera and to simultaneously drive said second end of said pin means out of said recess and to cause said adapter means to drive said one end to between said bifurcated means as said intermediate ring is rotatively driven by said diaphragm ring relative to said adapter means, said intermediate ring being thus held in positive driving engagement with said diaphragm ring until said pin means is returned to alignment with said recess.

34. An interchangeable lens assembly for a camera comprising:
 (a) lens barrel means having lens operative component means mounted therewith;
 (b) coupling means fixed on said lens barrel means adapted to be brought into engagement with complementary coupling means on said camera for releasably mounting said lens assembly in operative position on said camera;
 (c) adapter means mounted on said lens barrel means in rotative relationship relative thereto for establishing predetermined relative positioning between said interchangeable lens assembly and said camera;
 (d) retainer means adapted to be interposed between said adapter means and said camera for retaining said adapter means in fixed rotative position relative to said camera during mounting and dismounting of said interchangeable lens assembly; and
 (e) locking means for rotatively locking said adapter means and said lens barrel means together at a predetermined relative angular position when said lens assembly is mounted in operative position on said camera.

35. An interchangeable lens assembly for a camera including a camera body with coupling means comprising:
 (a) lens barrel means having mounted therein a phototaking lens for forming an image of an object to be photographed and a diaphragm device for controlling light entering through said phototaking lens, said lens barrel means having a tightening portion formed rigidly thereon for mating relationship with said coupling means;
 (b) diaphragm setting means rotatably mounted on said lens barrel means and operatively connected with said diaphragm device;
 (c) transmission means operatively connected with said diaphragm device for transmitting diaphragm signals between said lens assembly and said camera body; and
 (d) adapter means connected with said lens barrel means in rotatable relationship therewith and including an abutment surface forming an optical reference surface, said adapter means being adapted to be brought into abutting relationship with said camera body during mounting on said camera body, said adapter means being arranged to be restrained from rotational movement relative to said camera body while said lens barrel means is rotated to effect mating engagement between said tightening portion and said coupling means for fixing said lens assembly on said camera body, said adapter means being arranged to enable transmission therethrough of said diaphragm signals by said transmission means between said camera and said lens assembly; and
 (e) position defining means arranged for cooperative engagement between said adapter means and said camera body for maintaining said adapter means rotatively fixed at a predetermined position relative to said camera body during coupling and decoupling of said lens assembly.

36. An interchangeable lens assembly for a camera including a camera body with coupling means comprising:
(a) lens barrel means having mounted therein a phototaking lens for forming an image of an object to be photographed and a diaphragm device for controlling light entering through said phototaking lens, said lens barrel means having a tightening portion formed rigidly thereon for mating relationship with said coupling means;
(b) diaphragm setting means rotatably mounted on said lens barrel means and operatively connected with said diaphragm device;
(c) transmission means operatively connected with said diaphragm device for transmitting diaphragm signals between said lens assembly and said camera body;
(d) adapter means connected with said lens barrel means in rotatable relationship therewith and including an abutment surface forming an optical reference surface, said adapter means being adapted to be brought into abutting relationship with said camera body during mounting said lens assembly on said camera body, said adapter means being arranged to be restrained from rotational movement relative to said camera body while said lens barrel means is rotated to effect mating engagement between said tightening portion and said coupling means for fixing said lens assembly on said camera body, said adapter means being arranged to enable transmission therethrough of said diaphragm signals by said transmission means between said camera and said lens assembly; and
(e) position defining means for said adapter means comprising a fitted recess on one of said adapter means and an attachment bearing surface of said camera body and arranged upon attachment to said camera body to engage with a projection member provided on the other of said adapter means and an attachment bearing surface of said camera body, said adapter means being thereby maintained stationary at a predetermined position relative to said camera body during coupling operation.

37. An interchangeable lens assembly for a camera including a camera body with coupling means comprising:
(a) lens barrel means having mounted therein a phototaking lens for forming an image of an object to be photographed and a diaphragm device for controlling light entering through said phototaking lens, said lens barrel means having a tightening portion formed rigidly thereon for mating relationship with said coupling means;
(b) diaphragm setting means rotatably mounted on said lens barrel means and operatively connected with said diaphragm device;
(c) transmission means operatively connected with said diaphragm setting means for transmitting diaphragm signals between said diaphragm setting means and said camera body; and
(d) adapter means connected with said lens barrel means in rotatable relationship therewith and including an abutment surface forming an optical reference surface, said adapter means being adapted to be brought into abutting relationship with said camera body during mounting of said lens assembly on said camera body, said adapter means further including position defining means cooperating with position defining means provided on said camera body for holding said adapter means stationary relative to said camera body while said lens barrel means is rotated to effect mating engagement between said tightening portion and said coupling means for fixing said lens barrel means on said camera body, said adapter means being arranged to enable transmission therethrough of diaphragm signals by said transmission means.

* * * * *

UNITED STATES PATENT OFFICE
CERTIFICATE OF CORRECTION

Patent No. 4,230,403  Dated October 28, 1980

Inventor(s) Shigeru Hashimoto et al

It is certified that error appears in the above-identified patent and that said Letters Patent are hereby corrected as shown below:

Claim 1, line 1, after "assembly" insert -- according to claim 9 --.

Claim 15, line 1, change "camer" to -- camera --.

Claim 28, line 1, change "26" to -- 27 --.

Signed and Sealed this

Sixth Day of July 1982

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,230,403
DATED : October 28, 1980
INVENTOR(S) : Shigeru Hashimoto et al.

It is certified that error appears in the above-identified patent and that said Letters Patent is hereby corrected as shown below:

Claim 8, line 3, "tightening means" should read -- coupling means --.

Signed and Sealed this

Seventeenth Day of August 1982

[SEAL]

Attest:

Attesting Officer

GERALD J. MOSSINGHOFF
Commissioner of Patents and Trademarks